United States Patent
Wilman Rego et al.

(10) Patent No.: US 9,697,561 B2
(45) Date of Patent: Jul. 4, 2017

(54) SYSTEMS AND METHODS FOR ADMINISTERING CUSTOMER PURCHASING PROCESSES

(71) Applicant: W.W. GRAINGER, INC., Lake Forest, IL (US)

(72) Inventors: Andre Luis Wilman Rego, Libertyville, IL (US); Julie A. Dierwechter, Algonquin, IL (US); Craig Millman, Chicago, IL (US); Arlen James Young, Chicago, IL (US); Ezio Enrico Magarotto, Wheaton, IL (US); Bryan David Anderson, Chicago, IL (US)

(73) Assignee: W.W. GRAINGER, INC., Lake Forest, IL (US)

( * ) Notice: Subject to any disclaimer, the term of this patent is extended or adjusted under 35 U.S.C. 154(b) by 0 days.

(21) Appl. No.: 13/833,855

(22) Filed: Mar. 15, 2013

(65) Prior Publication Data
US 2014/0279279 A1 Sep. 18, 2014

(51) Int. Cl.
G06Q 30/00 (2012.01)
G06Q 30/06 (2012.01)
G06Q 10/06 (2012.01)

(52) U.S. Cl.
CPC ......... *G06Q 30/0637* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 7,386,476 B1 * | 6/2008 | Shavanadan et al. | 705/26.2 |
| 8,112,317 B1 * | 2/2012 | Ballaro | G06Q 10/087 705/26.1 |
| 2003/0014357 A1 * | 1/2003 | Chrisekos et al. | 705/39 |
| 2003/0069802 A1 * | 4/2003 | Ramsey-Catan | 705/26 |
| 2007/0179790 A1 * | 8/2007 | Leitch | G06Q 10/0633 705/301 |
| 2010/0131392 A1 * | 5/2010 | Archer | G06Q 30/02 705/26.1 |
| 2010/0274683 A1 * | 10/2010 | Hutchison et al. | 705/26 |
| 2012/0130853 A1 * | 5/2012 | Petri | G06Q 30/0609 705/26.35 |

OTHER PUBLICATIONS

Michael, Z.M. 2004, "Organizational Management in Workflow Applications—Issues and Perspectives", Information Technology and Management, vol. 5, No. 3-4, pp. 271-291.*
Michael, Z.M. 2004, "Organziational Management in Workflow Applications—Issues and Perspectives", Information Technology and Management, vol. 5, No. 3-4, pp. 271-291.*

* cited by examiner

*Primary Examiner* — Jason Dunham
*Assistant Examiner* — Brittany Bargeon
(74) *Attorney, Agent, or Firm* — Greenberg Traurig, LLP

(57) ABSTRACT

A customer purchasing workflow management functionality related to a customer account hosted by a vendor system is presented on a client computing device in a dashboard page. The system allows a customer to visualize purchasing workflows and processes by authorized purchasers and by authorized approvers, including the spending and approval limits associated with each, and the relationships therebetween. The system further provides for editing of the stored information comprising the purchasing workflows and processes.

16 Claims, 7 Drawing Sheets

GRAINGER.
FOR THE ONES WHO GET IT DONE

Hello, Benjamin B. Not Benjamin? Customer Service   Log out
Free Shipping on Orders of $2000* or More >

☐ Catalog | Find a Branch | 🛒 Cart Containers: (3) Items ✉

| PRODUCTS | SERVICES | RESOURCES | REPAIR PARTS | WORLDWIDE | Enter keyword or any item number | Search |

Account          Notices                              Orders                                        Lists                                              Order in Bulk ⌄
My Account Dashboard   Orders Pending My Approval (8)   Recent Orders (45) | Purchased Items   Monthly Maintenance | All Lists (15)

Home / My Account / Account Administration / Order Management

Order Management Dashboard

Enable Final Review
Learn More

Click Enable Order Management to reactivate Order Management functionality on this account.
—246
⚠ Order Management is currently suspended on this account  [ Enable Order Management ]  —248
—202

[ Learn More About The Dashboard                                                                                     ⌄ ]

Show All Users ▽                                    Suspend Order Management | Limits | Apply Settings To Multiple Users | View Workflow

| Name ▽ | Spend Limit | Approval Limit | Approvers | |
|---|---|---|---|---|
| A | | | | |
| Anderson, Richard<br>Warehouse Manager<br>Bessemer, AL | 2500 | 2500 | Any Approver | [ Edit ] |
| Anderson, Wayne<br>Bessemer, AL | Unlimited | 2500 | Any Approver | [ Edit ] |
| Angelo, Juan<br>Fresno, CA | 2500 | 2500 | Any Approver | [ Edit ] |
| Angelo, Peggy<br>Receiver<br>Bessemer, AL | 2500 | 2500 | ----- | [ Edit ] |
| B | | | | |
| Baade, Roy<br>Bessemer, AL | 500 | ----- | Any Approver | [ Edit ] |
| Babbit, Rachel<br>Warehouse Manager<br>Bessemer, AL | 1000 | 3500 | Angelo, Peggy | [ Edit ] |

A B C D E F G H I J K L M N O P Q R S T U V W X Y Z click to chat   click to talk

SYSTEMS AND METHODS FOR ADMINISTERING CUSTOMER PURCHASING PROCESSES

FIELD OF THE DISCLOSURE

The present description relates generally to customer administration of customer purchasing processes, such as identifying and associating purchasers and approvers, and more particularly to systems and methods for administering customer purchasing processes.

BACKGROUND OF RELATED ART

Currently, e-commerce related websites and/or other procurement software, whether business to business (B2B) or business to consumer (B2C), provide methods for a customer to authorize purchases. It is common for such customers to designate multiple authorized purchases and approvers, and set spending and approval limits as desired. The setup of this info into workflows and the maintenance of these workflows are generally performed by vendors. However, as the customer experiences routine employee turnover, internal policy changes, job changes, and/or location changes, maintenance of these workflows are often times necessary.

Thus, while the background systems and methods identified herein, generally work for their intended purpose, the presently disclosed systems and methods provide improvements thereto, for instance, by providing systems and methods in which a customer can administer their own purchasing workflows and processes.

BRIEF DESCRIPTION OF THE DRAWINGS

For a better understanding of the present disclosure, reference may be had to various examples shown in the attached drawings.

FIG. 5 illustrates the dashboard page of FIG. 2 in suspended format.

DETAILED DESCRIPTION

The following description of example systems and methods is not intended to limit the scope of the description to the precise form or forms detailed herein. Instead the following description is intended to be illustrative so that others may follow its teachings. In particular, it is to be understood that the example pages disclosed herein include illustrative, fictional names for the purposes of explanation only, and that any similarity of these fictional names to any person is purely coincidental.

Systems and methods for customer administration of customer purchasing processing are described herein. In general, the example methods and systems provide the customer with the ability to manage purchasing workflows and processes saved in a vendor's database, including designation of authorized purchasers and approvers, determination of spending and approval limits, and association of purchasers and approvers all through a single user interface.

Figure 1:
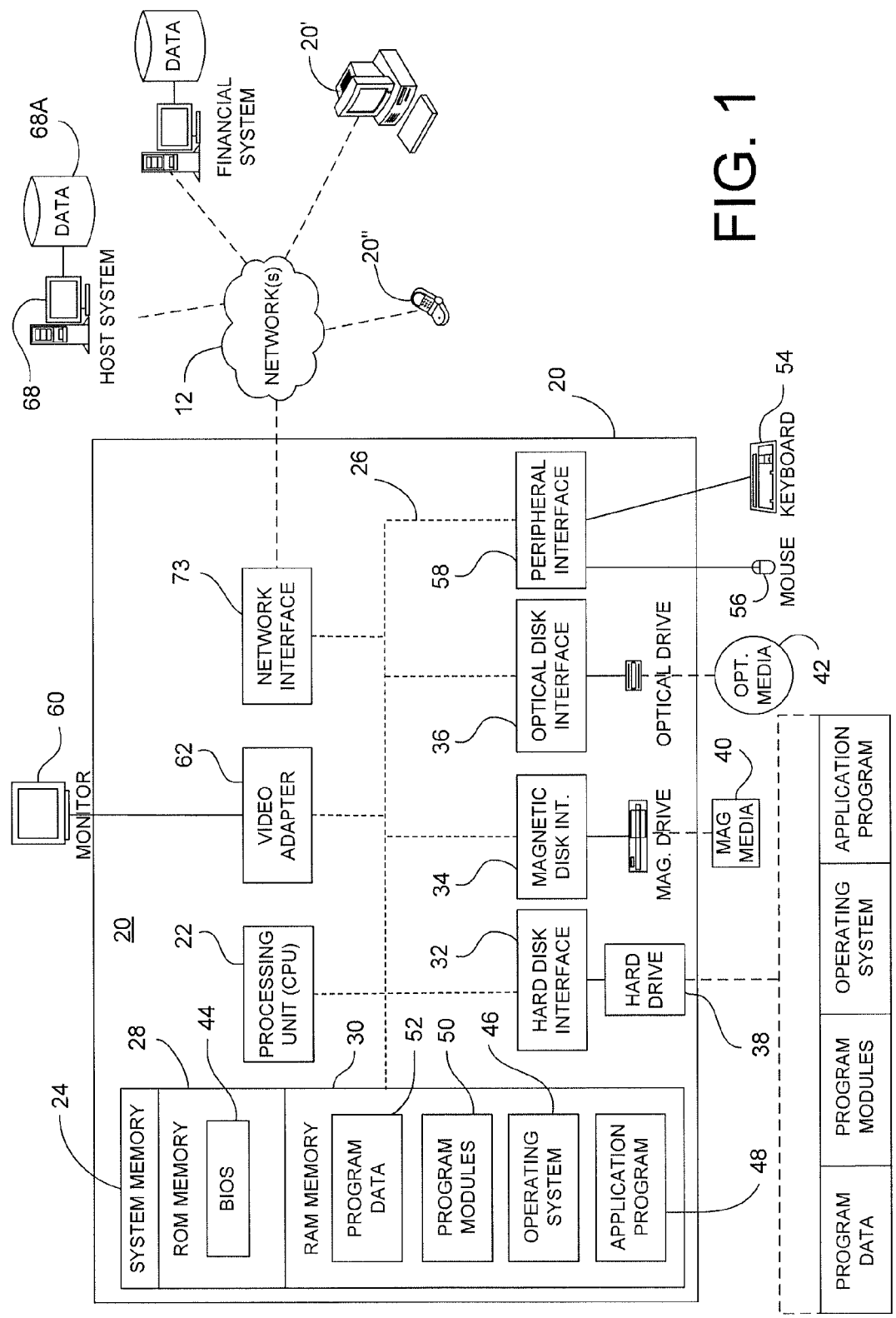
FIG. 1 illustrates in block diagram form components of an example, computer network environment suitable for implementing example purchasing workflow administration systems disclosed.

With reference to the figures, and more particularly, with reference to FIG. 1, the following discloses various example systems and methods for customer administration of customer purchasing processes on a computer network, such as a personal computer or mobile device. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a user, client, corporate shopper, buyer, consumer, etc., to access a host system server 68 and, among other things, be connected to a hosted vendor purchasing system, e.g., a website, mobile application, etc. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, a mainframe computer, a personal-digital assistant ("PDA"), a cellular telephone, a mobile device, a tablet, an ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules, and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. The example data repository 68A may include any suitable vendor data including, for example, customer/company information, electronic catalog pages, order information, etc. In this example, the data repository 68A includes a listing of the authorized users for the customer's account in the vendor's database and the customer's purchasing workflows and processes for that account. That information includes include at least one of a listing of a plurality of authorized purchasers for a customer, a listing of authorized approvers for the customer, or a listing of spending limits for the customer. The example data repository 68A may further include a listing of approval limits for the customer and relationship information between each these listings, e.g. which spending and/or approval limit is applicable to any one authorized purchaser and/or approver. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, facilitating the ordering of a vendor product, facilitating the input of authorized users, authorizing purchasing authority for a customer, providing access to merchandise purchasing, etc.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

As noted above, in the present example, a customer generally interacts with the host system server 68 to manage its purchasing processes and workflows. To facilitate this process, the host system server 68 provides access to a user interface, such as, for example, a dashboard page 200 (FIG. 2) that is made conveniently accessible on a page, such as a mobile application page, webpage, etc. displayed on the client computing device. More particularly, as illustrated in the example dashboard page 200 of FIG. 2, the host system server 68 provides information maintained in the data repository 68A for a user interface element 202 presented in the form of a table. The user interface element 202 includes a sub-menu 204 at the top thereof and a plurality of columns populated with information maintained in the data repository 68A and associated user interface (graphical user interface, web-based user interface, touchscreen user interface, etc.) elements. In the particular example of FIG. 2, the user interface element 202 includes a first column 206 including authorized purchasers for the customer; a second column 208 with the respective ones of the customer's spending limits associated with the authorized purchaser in the corresponding row of first column 206; a third column 210 with the respective ones of the customer's approval limits associated with the authorized purchaser in the corresponding row of first column 206; and a fourth column 212 with an identification of one or more of the customer's authorized approvers associated with the authorized purchaser in the corresponding row of first column 206. As noted above, the customer's listings of authorized purchasers, spending limits, approval limits, and authorized approvers, as well as information regarding the association therebetween, are stored in the data repository 68A and may be sorted, filtered and/or displayed in any suitable way.

The user interface element 202 further includes a user interface element 214, in the exemplary form of a button, for each row thereof. The example buttons 214 are labeled in FIG. 2 with the term "Edit." According to the principles of the present disclosure, the customer may select one of the buttons 214 to enable management of the stored information relative to the authorized purchaser from the corresponding row of the first column 206. In this instance, each of the buttons 214 provides a method by which a customer may select an authorized purchase, to conveniently edit and manage the associated criteria which comprise the customer's purchasing workflows and processes. It will be appreciated that the form, location, etc., of the example buttons 214 may be displayed and/or vary as desired by design, and/or by display type (e.g., mobile device, personal computer, tablet, etc.).

Figure 3:
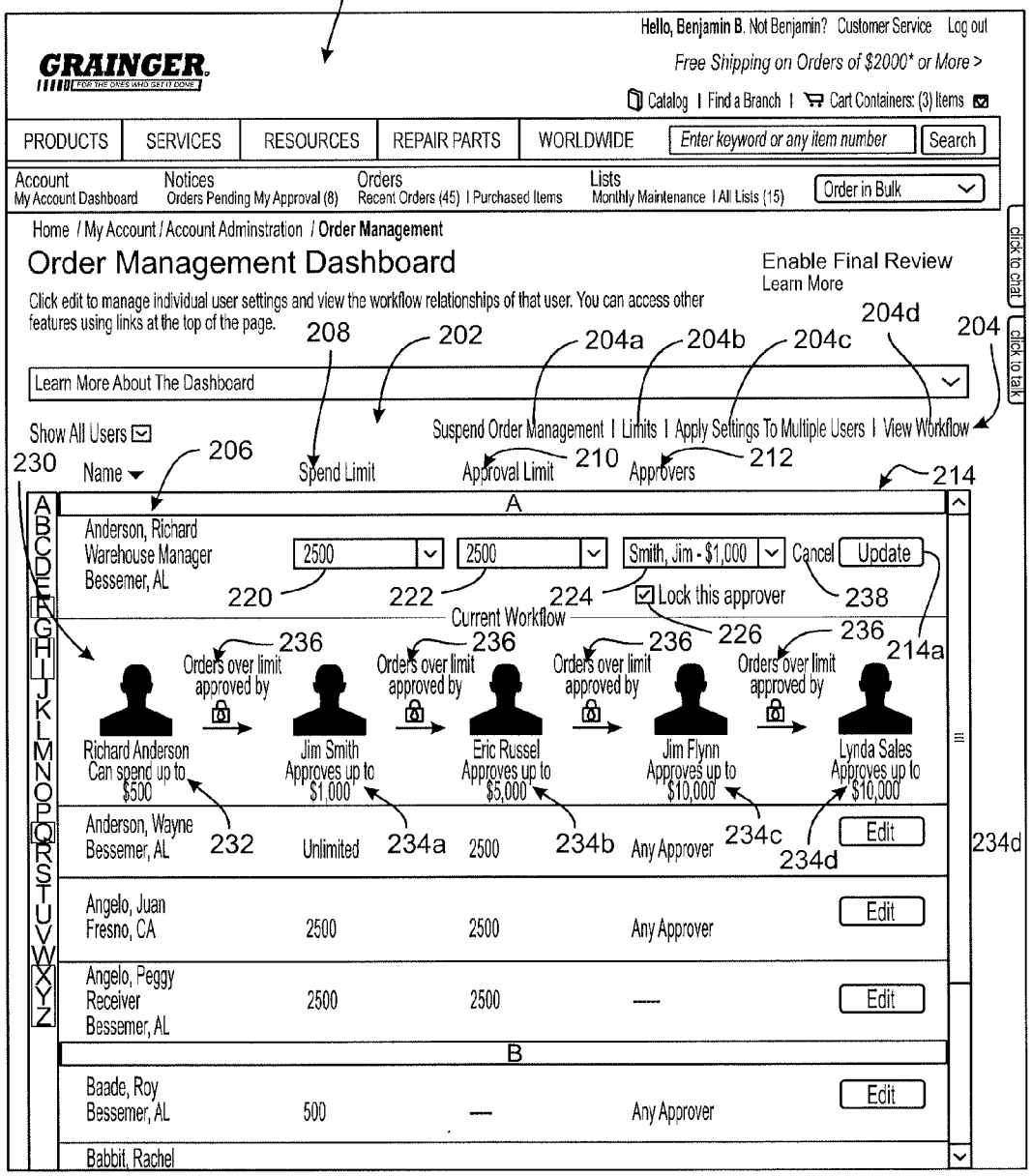
FIG. 3 illustrates the example dashboard page of FIG. 2 showing the management capability activated as to one authorized purchaser, including the graphical individualized workflow display for that purchaser.

Upon the selection of one of the buttons 214, the user interface element 202 presents the corresponding row in editing format, as illustrated in the example of FIG. 3. In this instance, the button 214a indicates that the editing functionality is activated with the label "Update." Moreover, the spending limit, approval limit and authorized approvers associated with the selected authorized purchaser are displayed in the first drop menu 220, the second drop menu 222, and the third drop menu 224, respectively. For the example selected authorized purchaser of FIG. 3, the example associated spending limit of $500 is displayed in the first drop menu 220. To enable selective editing of the spending limit associated with the selected authorized purchaser, the first drop menu 220 includes the customer's listing of spending limits maintained in the data repository 68A upon expansion of the first drop menu 220. The customer's selection of a different spending limit through the first drop menu 220 will change the spending limit associated with the selected authorized purchaser and maintained in the data repository 68A. It will be appreciated that display and selection of alternative spending limits through the first drop menu 220 is exemplary in nature, and that these actions may be caused by any suitable user interface features, including for example, a scroll-through listing of the alternative spending limits or a listing of the spending limits in a pop-up window.

Similar to the first drop menu 220 described above, the second drop menu 222, and the third drop menu 224, respectively, provide for selective editing of the approval limit and authorized approvers associated with the selected authorized purchaser from the customer's listings of approval limits and authorized approvers maintained in the data repository 68A. The customer's modification of the approval limit and/or authorized approvers through the second drop menu 222 and/or the third drop menu 224, respectively, will change the approval limit and/or authorized approvers associated with the selected authorized purchaser and maintained in the data repository 68A. Similar to the first drop menu 220, it will be appreciated that display and selection of alternative approval limits through the second drop menu 222 and alternative authorized approvers through the third drop menu 224 are exemplary in nature, and that these actions may be caused by any suitable user interface features.

In addition to managing the association of authorized approvers for the selected authorized purchaser through the third drop box 224, the user interface element 202 enables the customer to modify the characteristics of the association between the selected authorized purchaser and any one of the associated authorized approvers. In the example of FIG. 3, the user interface element 202 further includes a checkbox 226 adjacent to the third drop menu 224 in the selected row in editing format, with the checkbox 226 having the exemplary label "Lock this approver." According to the principles of the present disclosure, the customer may select the checkbox 226 to prioritize or lock the approval relationship between the selected authorized purchaser and the displayed authorized approver in the third drop box 224, which prioritization is stored in the data repository 68A. The prioritization of authorized approvers, together with the assigned spending and approval limits, define the customer's purchasing and approval workflows.

The user interface element 202 further graphically illustrates the workflow associated with the selected authorized purchaser, to enable the customer to readily understand and manage that workflow. In the example of FIG. 3, the user interface element 202 includes a workflow sub-display 230 to illustrate the relationship between an authorized purchaser and associated authorized approvers in a graphical or diagram format. In the example workflow sub-display 230, the selected authorized purchaser and the applicable spend limit is illustrated as a purchaser icon 232, and up to four prioritized or locked authorized approvers and their own associated approval limits are illustrated with approver icons 234a-234d. The workflow sub-display 230 illustrates the prioritized or locked relationship between the selected authorized purchaser and the locked authorized approvers with lock icons 236, which are illustrated in FIG. 3 in exemplary format with explanatory text "Order over limit approved by," a lock graphic, and an arrow indicating the approval relationship. According to the principles of the present disclosure, as the customer modifies the spending limit, approval limit and/or authorized approvers associated with the selected authorized purchaser, the workflow sub-display 230 is updated to illustrate those modifications.

Figure 2:
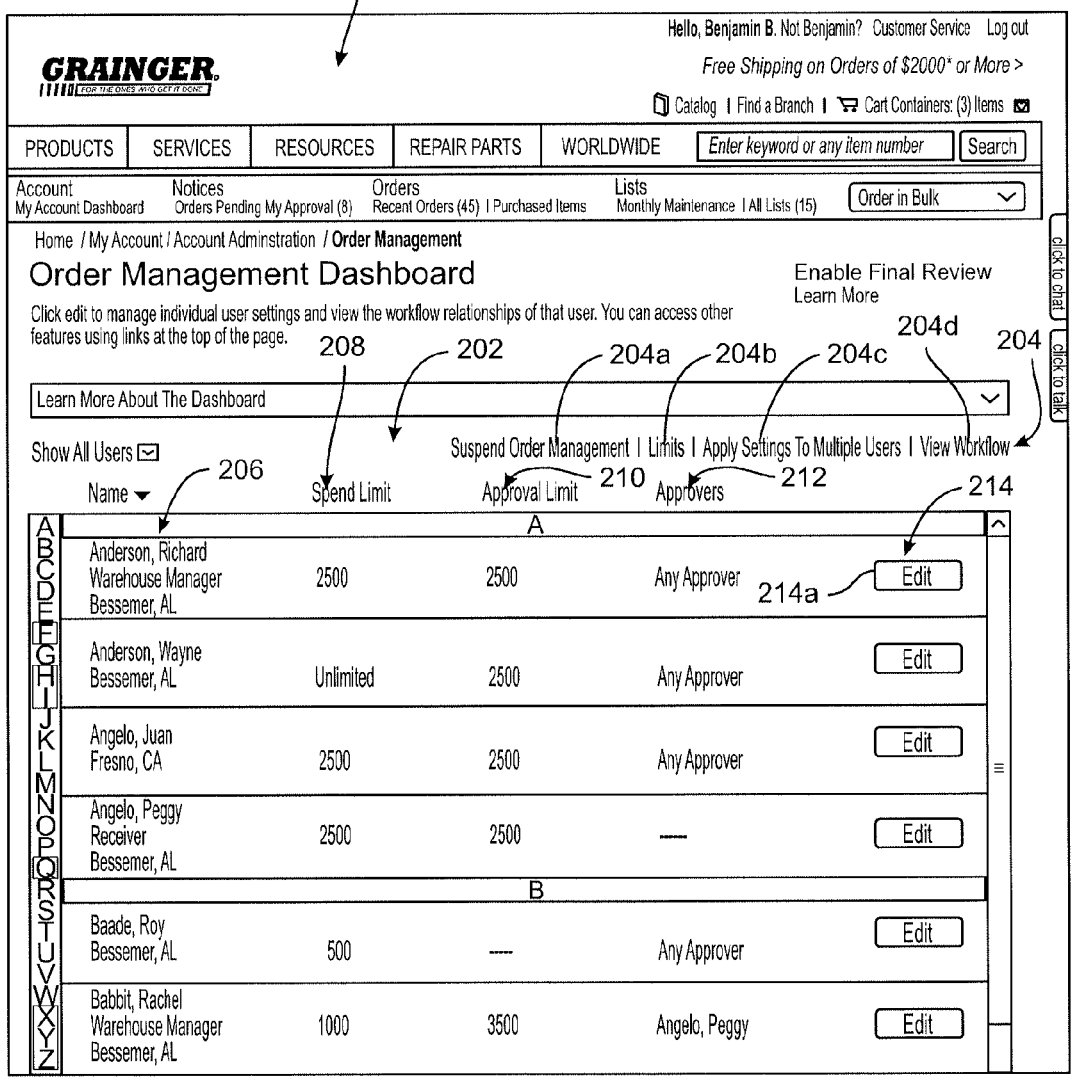
FIG. 2 illustrates an example dashboard page in which a customer can view spending limits, approval limits, and approval workflow for multiple authorized purchasers.

When the customer has completed management of the selected authorized purchaser, the customer activates the button 214a to update the respective information associated with the selected authorized purchaser in the data repository 68A, and the host system server 68 returns the user interface element 202 to a "read" mode such as illustrated in FIG. 2. Alternatively, should the customer wish to not save the edits associated with the selected authorized purchaser, the customer can select a cancel link 238 to revert the information associated with the selected purchaser to the pre-editing settings, and the host system server 68 returns the user interface element 202 to the "read" mode illustrated in FIG. 2. According to the principles of the present disclosure, the customer can itself manage its purchasing workflows on an authorized purchaser basis by repeating this process for any of the authorized purchasers, as desired or necessary.

As described herein, the user interface element 202 of the dashboard page 200 includes a display sub-menu 204. In the example of FIG. 2, the display sub-menu 204 includes four action links 204a-204d. The first link 204a, labeled "Suspend Order Management," enables a customer to suspend all of the limits and approvals identified in their account, as described in additional detail herein. The second link 204b, labeled "Limits," provides the customer a readily available access point to modify the listings of spending and approval limits maintained in the data repository 68A, as described in additional detail herein. The third link 204c, labeled "Apply Setting To Multiple Users," provides the customer a readily available access point to modify limit and approver settings for multiple users to default or other preset settings maintained in the data repository 68A. The fourth link 204d, labeled "View Workflow," enables the customer to view the purchasing processes and workflows organized by authorized approver, as described in additional detail herein. It will be will be appreciated by one of ordering skill in the art that the number and type of action links may vary as desired.

Figure 4:
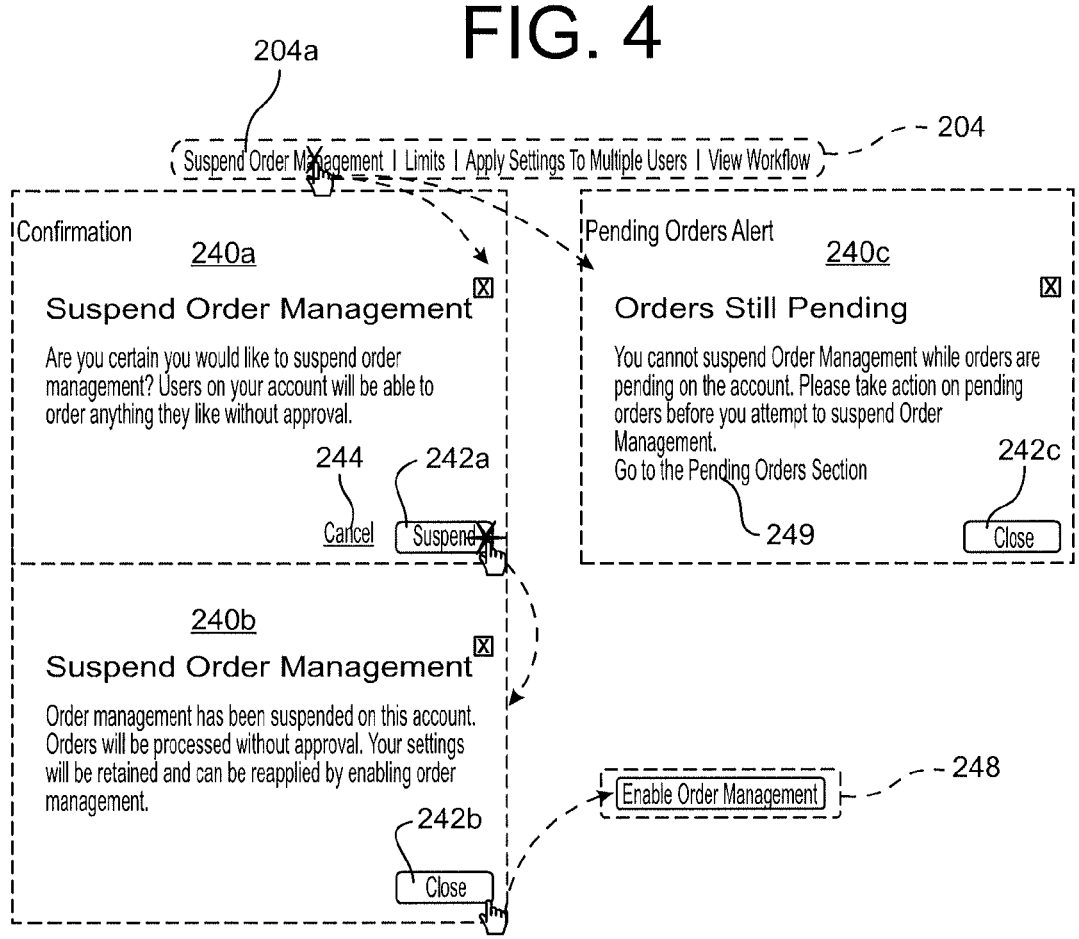
FIG. 4 illustrates example windows accessible from the dashboard page of FIG. 2 which are displayed when a customer seeks to suspend application of all purchasing workflows.

With reference to FIG. 4, when the customer activates the first link 204a of the display sub-menu 204 of the user interface element 202, to suspend the active purchasing workflows and processes on their account, the host system server 68 display a response window. If there are no orders pending in the customer's account, the host system server 68 displays a confirmation response window 240a, including an action button 242a and a cancel link 244. If the customer desires to proceed with suspension of the purchasing workflows and processes, the action button 242 of confirmation the response window 240a is engaged, and the host system server 68 displays a suspension response window 240b. The customer can terminate this operation via a cancel link 244.

When the suspension response window 240b is closed via an action button 242b, the host system server 68 displays the dashboard page 200 in the suspended format illustrated in FIG. 5. For this example, the user interface element 202 is inactive, and the dashboard page 200 includes an alert 246 (illustrated with the text "Order Management is currently suspended on this account") and an enablement button 248, labeled in the example of FIG. 5 as "Enable Order Management." The customer may then direct the host system server 68 to re-activate the purchasing processes and workflows via the enablement button 248.

Referring again to FIG. 4, if there are orders pending in the customer's account upon the customer's selection of the first link 204a of the display sub-menu 204 of the user interface element 202, the host system server 68 displays an alert response window 240c, including a close window button 242c and a pending orders link 249. In this example, the customer is prevented from suspending the purchasing processes and workflows if there are any pending orders. The pending orders link 249 provides an access point to the customer's orders in the account in the vendor's database, so that the customer may take action on any such orders, if desired.

Figure 6:
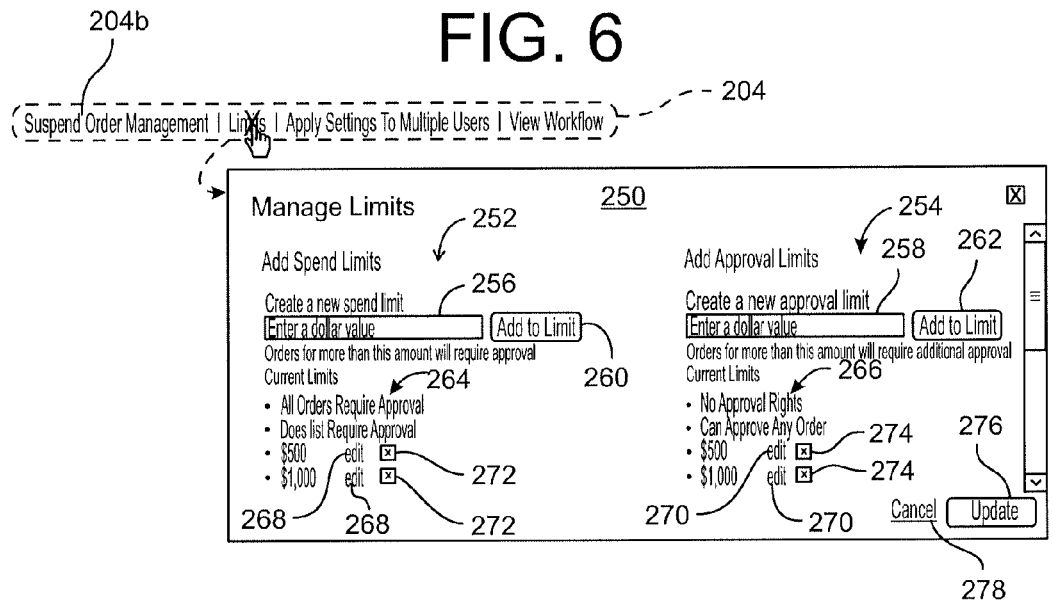
FIG. 6 illustrates an example window accessible from the dashboard page of FIG. 2 in which a customer can edit spending and approval limits.

With reference to FIG. 6, when the customer activates the second link 204b of the display sub-menu 204 of the user interface element 202, to manage and/or edit their listings of spending and/or approval limits maintained in the data repository 68A, the host system server 68 displays a limit management window 250. The limit management window 250 includes a spending limit area 252 and an approval limit area 254, which respectively include text entry boxes 256, 258, action buttons 260, 262, and listings 264, 266 of the customer's spending and approval limits maintained in the data repository 68A. The customer may add values to the listings 264, 266 by entering values into the text entry boxes 256, 258 and the activating action buttons 260,262, respectively. Each numerical entry on the listings 264, 266 includes associated edit links 268, 270 and delete buttons 272, 274, which may be used to modify the existing values. It should be understood that alert notifications and sub-windows may be utilized to facilitate modification of existing spending and approval limits. If the customer desires to proceed with updating the spending and approval limits maintained in the data repository 68A with any such modifications, an update button 276 may be engaged. The customer can cancel updating the spending and approval limits maintained in the data repository 68A via a cancel link 278.

The customer may activate the third link 204c of the display sub-menu 204 of the user interface element 202 to manage settings for the authorized users of its account. In one example, in response to activation of the third link 204c, the host system server 68 displays a window showing the current roles of the customer's authorized users, such as a standard authorized purchaser and/or a standard authorized approver, and facilitates modification of the standard settings applicable to all users so designated and maintained in the data repository 68A. It will be appreciated by one of ordinary skill in the art that these display and modification features may be provided in any suitable format, as desired.

Figure 7A:
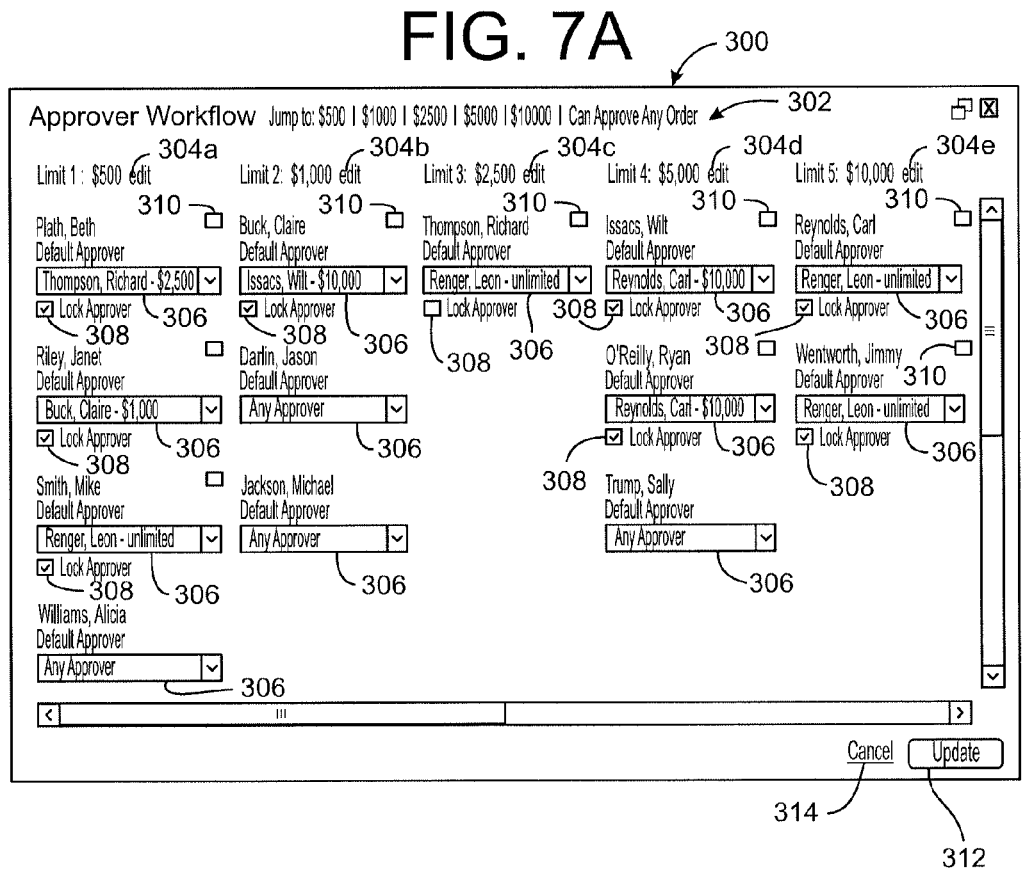
FIGS. 7A-7C illustrate an example windows accessible from the dashboard page of FIG. 2 in which a customer can manage their purchasing processes by authorized approver.

With reference to FIG. 7A, when the customer activates the fourth link 204d of the display sub-menu 204 of the user interface element 202, the host system server 68 displays the workflow window 300. The workflow window 300 organizes the customer's authorized approvers by their respectively associated approval limits, to enable the customer to visualize the setup of the multiple approval levels and perform maintenance from a single window. The workflow window 300 includes a jump link sub-menu 302, which includes links for each entry in the customer's listing of approval limits maintained in the data repository 68A. Upon selection of one of the links of the jump link sub-menu 302, the host system server 68 modifies the workflow window 300 to display the column of the selected approval limit value at the left border of the window. The workflow window 300 provides edit links 304a-e for each approval limit value, to provide the customer a readily available access point to modify that approval limit, while visualizing all of the authorized approvers in a column to which a modification would apply. For each of the authorized approvers, the workflow window 300 includes an identification of any associated approver. As illustrated in the example of FIG. 7A, the respective associated authorized approvers are listed in each drop menu 306. The drop menus 306 provide access to the listing of authorized approvers maintained in the data repository 68A. The drop menus 306 are provided to provide the customer a readily available access point to modify approval relationships maintained in the data repository 68A. When an approver is associated with another specific approver identified in the drop menu 306, as opposed to "Any Approver," the workflow window 300 includes a checkbox 308 to enable locking or prioritization of the approvers and a workflow icon 310. According to the principles of the present disclosure, the customer may select the checkbox 308 to prioritize the approval relationship between the associated authorized approver and the displayed authorized approver in the drop menu 306. Changes to the approval relationships or approval limits in work flow are maintained in the data repository 68A upon activation of the update button 312, or cancelled via the cancel link 314.

Figure 7B:
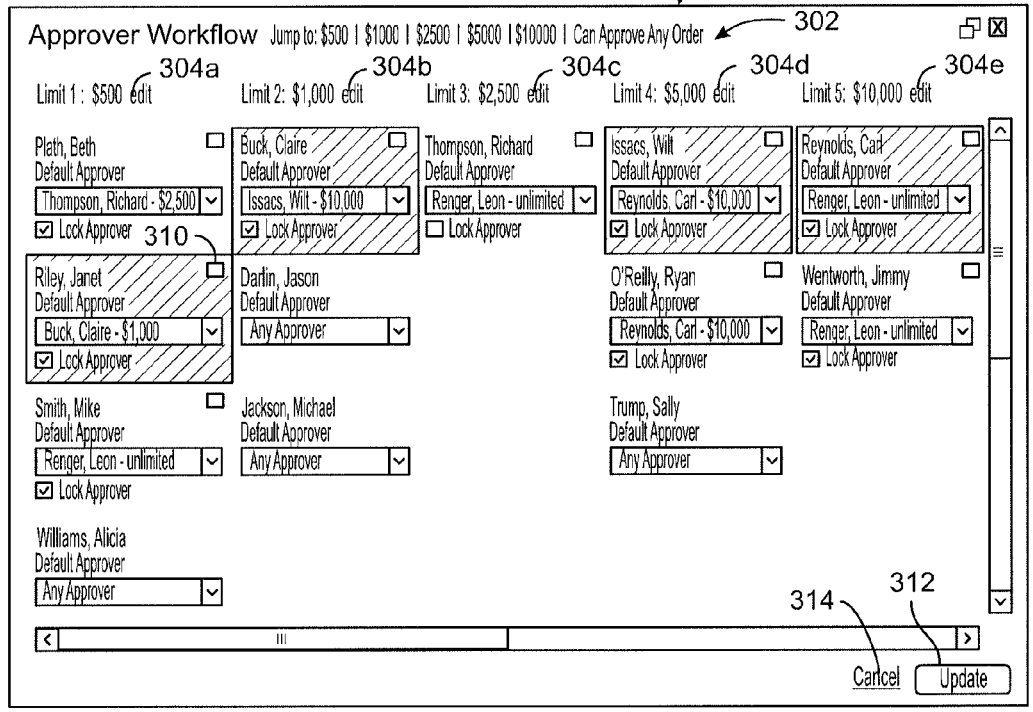
Figure 7C:
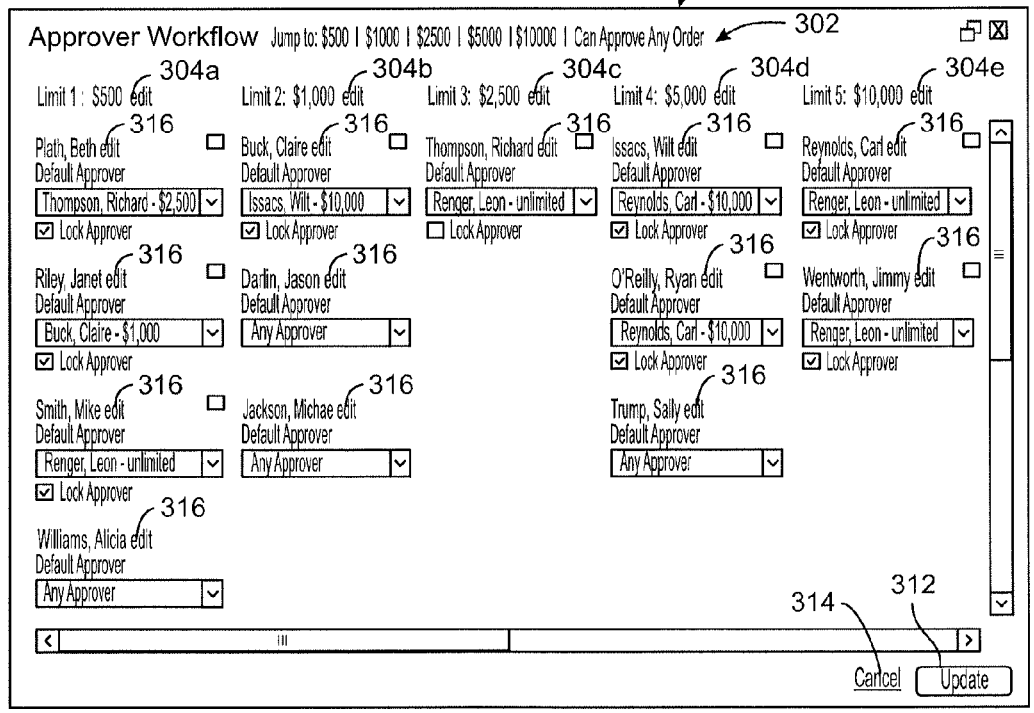

Referring to FIG. 7B, upon activation of one of the workflow icons 310, all associated approvers are highlighted, to enable the customer to visualize the workflow on an approver-by-approver basis. Referring to FIG. 7C, the workflow window 300 may alternatively be displayed in "read" mode, in which the drop menus 306 and the checkboxes 308 are disabled, and the edit links 316 are included, to provide editing functionality in sub-windows accessible through the edit links 316.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A non-transient, computer readable media having stored thereon instructions for providing access to manage customer purchasing workflow information within a hosted vendor purchasing system, the instructions performing steps comprising:

storing in a data repository with the hosted vendor purchasing system a listing of authorized purchasers for a customer, a listing of authorized approvers for the customer, and a listing of spending limits for the customer, wherein each of the authorized purchasers is selectively associated with one of the spending limits and is capable of being associated with one or more of the authorized approvers via use of association data stored in the data repository;

causing a dashboard page to be displayed on a display associated with a client computing device within host system in communication with the hosted vendor purchasing system, the dashboard page comprising the listing of authorized purchasers, the spending limit respectively associated with each of the authorized purchasers, and an identifier of any one or more of the authorized approvers respectively associated with each of the authorized purchasers;

causing a first plurality of user interface elements, each corresponding to one of the authorized purchasers, to be presented on the display associated with the client computing device;

in response to a selection of one of the first plurality of user interface elements associated with a selected one of the authorized purchasers, causing both a second plurality of user interface elements and an authorization work flow diagram to be presented on the display associated with the client computing device, wherein each of the second plurality of user interface elements respectively corresponding to one of the spending limit and any one or more of the authorized approvers for the selected one of the authorized purchasers and wherein the authorization workflow diagram depicts a representation of an authorization workflow relationship between the selected one of the authorized purchasers and any one or more of the authorized approvers for the selected one of the authorized purchasers; and in response to a selection of one of the second plurality of user interface elements, respectively accessing one of the listing of the spending limits and the listing of the authorized approvers, to enable the customer to selectively change the association data stored in the data repository to thereby modify the association of the respective one of the spending limit and any one or more of the authorized approvers with the selected one of the authorized purchasers, causing the display associated with the client computing device to be dynamically updated to reflect a modification of the authorization workflow relationship between the selected one of the authorized purchasers and any one or more of the authorized approvers for the selected one of the authorized purchasers made via use of the second plurality of user interface elements, and causing the modification of the authorization workflow relationship made by the customer to be saved in the data repository with the hosted vendor purchasing system whereby the saved authorization work flow is usable by the hosted vendor purchasing system in managing and routing purchasing approvals originating from the host system.

2. A computer-readable media as recited in claim 1, the instructions performing steps further comprising storing in the data repository a listing of approval limits for the customer, wherein each of the authorized approvers is selectively associated with one of the approval limits and is capable of being associated with one or more of the authorized purchasers via use of the association data stored in the data repository.

3. A computer-readable media as recited in claim 2, wherein one or more of the authorized purchasers is also an authorized approver, and wherein the dashboard page further comprises any approval limit respectively associated with each of the authorized purchasers.

4. A computer-readable media as recited in claim 3, wherein the second plurality of user interface elements further includes elements respectively corresponding to the approval limit for the selected one of the authorized purchasers.

5. A computer-readable media as recited in claim 2, wherein the second plurality of user interface elements further includes elements for preventing a change in the association data stored in the database thereby locking the association between the selected one of the authorized purchasers and the any one or more of the authorized approvers.

6. A computer-readable media as recited in claim 2, wherein the selected one of the authorized purchasers is associated with a plurality of authorized approvers.

7. A computer-readable media as recited in claim 1, the instructions performing steps further comprising causing a suspension link to be presented on the dashboard page on the display associated with the client computing device; and, in response to a selection of the suspension link, inactivating the spending limits and the association between each of the authorized purchasers and any one or more of the authorized approvers.

8. A computer-readable media as recited in claim 1, the instructions performing steps further comprising causing a limit link to be presented on the dashboard page on the display associated with the client computing device; and, in response to a selection of the limit link, accessing the listing of the spending limits, to enable the customer to selectively modify the listing of the spending limits.

9. A system for administration of customer purchasing workflow information in a vendor database, the system comprising:

a vendor data repository within a hosted vendor purchasing system, the vendor data repository maintaining a listing of authorized purchasers for a customer, a listing of authorized approvers for the customer, and a listing of spending limits for the customer, wherein each of the authorized purchasers is selectively associated with one of the spending limits and is capable of being associated with one or more of the authorized approvers via use of association data stored in the data repository;

a vendor server within the hosted vendor purchasing system in communication with the vendor data repository;

a client computing device within host system, having an associated display, in communication with the vendor server;

a dashboard page selectively displayed on the display associated with the client computing device, the dashboard page including the listing of authorized purchasers, the spending limit respectively associated with each of the authorized purchasers, and an identifier of any one or more of the authorized approvers respectively associated with each of the authorized purchasers;

a first plurality of user interface elements presented on the display associated with the client computing device, each corresponding to one of the authorized purchasers; and an authorization workflow diagram and a second plurality of user interface elements selectively presented together on the display associated with the client computing device in response to a selection of one of the first plurality of user interface elements associated with a selected one of the authorized purchasers, each of the second plurality of user interface elements respectively corresponding to one of the spending limit and any one or more of the authorized approvers for the selected one of the authorized purchasers and the authorization workflow diagram depicting a representation of an authorization workflow relationship between the selected one of the authorized purchasers and any one or more of the authorized approvers for the selected one of the authorized purchasers, wherein the vendor server respectively accesses and presents on the display associated with the client computing device one of the listing of the spending limits and the listing of the authorized approvers in response to a selection of one of the second plurality of user interface elements, to enable the customer to selectively change the association data stored in the data repository to thereby modify the association of the respective one of the spending limit and any one or more of the authorized approvers with the selected one of the authorized purchasers, wherein the display associated with the client computing device is caused to be dynamically updated to reflect a modification of the authorization workflow relationship between the selected one of the authorized purchasers and any one or more of the authorized approvers for the selected one of the authorized purchasers made via use of the second plurality of user interface elements, and wherein the modification of the authorization workflow relationship made by the customer is caused to be the modification of the authorization workflow relationship made by the customer to be saved in the vendor data repository within the hosted vendor purchasing system whereby the saved authorization workflow is usable by the hosted vendor purchasing system in managing and routing purchasing approvals originating from the host system.

10. A system as recited in claim 9, wherein the data repository maintains a listing of approval limits for the customer and each of the authorized approvers is selectively associated with one of the approval limits and is capable of being associated with one or more of the authorized purchasers via use of the association data stored in the data repository.

11. A system as recited in claim 10, wherein one or more of the authorized purchasers is also an authorized approver, and wherein the dashboard page further includes any approval limit respectively associated with each of the authorized purchasers.

12. A system as recited in claim 11, wherein the second plurality of user interface elements further includes elements respectively corresponding to the approval limit for the selected one of the authorized purchasers.

13. A system as recited in claim 10, wherein the second plurality of user interface elements further includes elements for preventing a change in the association data stored in the data repository thereby locking the association between the selected one of the authorized purchasers and the any one or more of the authorized approvers.

14. A system as recited in claim 10, wherein the selected one of the authorized purchasers is associated with a plurality of authorized approvers.

15. A system as recited in claim 9, further comprising a suspension link presented on the dashboard page on the display associated with the client computing device, wherein the vendor server inactivates the spending limits and the association between each of the authorized purchasers and any one or more of the authorized approvers in response to a selection of the suspension link.

16. A system as recited in claim 9, further comprising a limit link presented on the dashboard page on the client computing device, wherein the vendor server accesses and presents on the display associated with the client computing device the listing of the spending limits in response to a selection of the limit link, to enable the customer to selectively modify the listing of the spending limits.

* * * * *